United States Patent
Wu

(10) Patent No.: US 9,328,533 B2
(45) Date of Patent: May 3, 2016

(54) DOOR LOCK MANAGEMENT CONTROL SYSTEM

(71) Applicant: MICROPROGRAM INFORMATION CO., LTD., Taichung (TW)

(72) Inventor: Teng-Yen Wu, Taichung (TW)

(73) Assignee: Microprogram Information Co., Ltd., Taichung (TW)

( * ) Notice: Subject to any disclaimer, the term of this patent is extended or adjusted under 35 U.S.C. 154(b) by 0 days.

(21) Appl. No.: 14/571,409

(22) Filed: Dec. 16, 2014

(65) Prior Publication Data

US 2015/0206365 A1    Jul. 23, 2015

(30) Foreign Application Priority Data

Jan. 23, 2014  (TW) .............................. 103201403 U

(51) Int. Cl.
| | |
|---|---|
| *G05B 19/00* | (2006.01) |
| *E05B 47/00* | (2006.01) |
| *H04B 5/00* | (2006.01) |
| *G07C 9/00* | (2006.01) |

(52) U.S. Cl.
CPC ............. *E05B 47/00* (2013.01); *G07C 9/00182* (2013.01); *H04B 5/0031* (2013.01); *H04B 5/0075* (2013.01); *G07C 2009/00769* (2013.01); *G07C 2009/00841* (2013.01); *G07C 2209/04* (2013.01)

(58) Field of Classification Search
CPC .............. E05B 47/00; G07C 9/00182; G07C 2009/00841; G07C 2209/04; G07C 2009/00769; H04B 5/0075; H04B 5/0031
USPC .................. 340/5.6, 5.61, 5.8, 5.81; 341/176; 705/44, 71, 67, 21
See application file for complete search history.

(56) References Cited

U.S. PATENT DOCUMENTS

| | | | | |
|---|---|---|---|---|
| 2015/0170448 A1* | 6/2015 | Robfogel | ........... | G07C 9/00904 340/5.61 |
| 2015/0199859 A1* | 7/2015 | Ouyang | ............. | G07C 9/00111 340/5.61 |
| 2015/0208245 A1* | 7/2015 | Robinton | .............. | H04L 9/3247 455/411 |

* cited by examiner

*Primary Examiner* — Dhaval Patel
(74) *Attorney, Agent, or Firm* — Alan D. Kamrath; Kamrath IP Lawfirm, P.A.

(57) ABSTRACT

A door lock management control system includes a door controller, a main controller, and a near field communication device. The main controller includes one or both of a key tag and a near field communication controllable device. A door access APP is installed in the near field communication device and obtains an access identification number. The access identification number is stored in a memory of the near field communication device. A door access APP is installed in the near field communication controllable device and obtains a management identification number. The door controller can be operated to grant door lock management authority to one or both of the key tag and the near field communication controllable device. Door access authority of the near field communication device can be granted or cancelled by either of the key tag and the near field communication controllable device through near field communication.

20 Claims, 7 Drawing Sheets

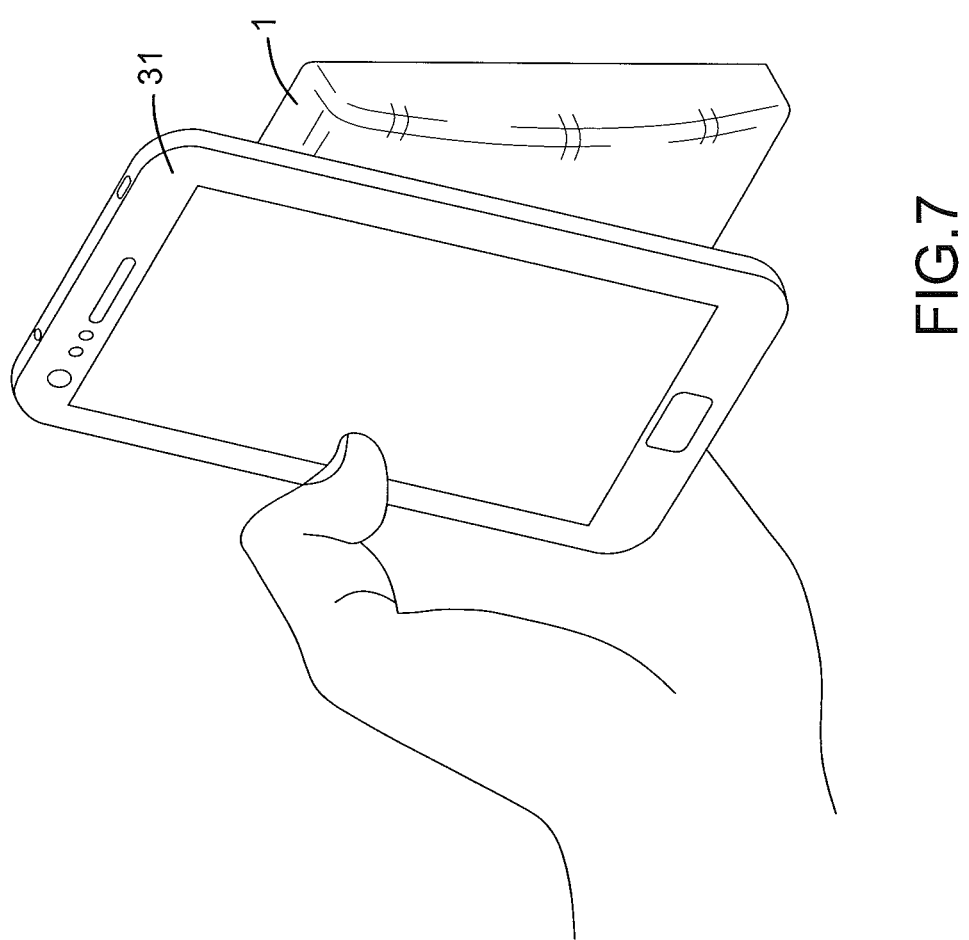

DOOR LOCK MANAGEMENT CONTROL SYSTEM

BACKGROUND OF THE INVENTION

The present invention relates to a door lock management control system and, more particularly, to a door lock management control system incorporating near field communication (NFC) technique.

More and more modern intelligence buildings utilize electronic locks to control opening and closing of doors. Door access control systems for buildings are commonly used to enhance convenience and safety of the users. Mechanical locks have been gradually replaced by inductive type electronic locks which not only mitigates the troublesome unlocking procedures but reduces the personnel costs of administrators. Thus, many buildings or offices use electronic locks and inductive cards to control door access.

In a one-to-many electronic lock, the administrator holds a key tag for setting the door access authorization. Thus, each of the many users using the door requires the administrator to firstly proceed with setting (adding into or deleting from the access list) by the key tag, and then place an inductive card close to the key tag to obtain the door access authorization. However, safety risks occur in the door access management system if the administrator holding the key tag cannot timely add a user to the access list or delete a user from the access list due to unavoidable reasons.

Carriage of inductive cards in convenient to users that have already carried a lot of remote controls used in houses, offices, cars, and it is common that the users forget to carry or lose the inductive cards and the remote controls. Safety risks occur in a case that a user loses the inductive card and the administrator fails to timely delete the user from the access list.

Thus, a need exists for a novel door lock management control system that mitigates and/or obviates the above disadvantages.

BRIEF SUMMARY OF THE INVENTION

An objective of the present invention is to provide a door lock management control system suitable for mobile devices with a near field communication function to provide convenient access and efficient management while optionally eliminating the needs of producing and dispatching inductive cards.

In a first aspect, a door lock management control system includes a near field communication device, a key tag, and a door controller. A door access APP is installed in the near field communication device and obtains an access identification number. The access identification number is stored in a memory of the near field communication device. A first management identification number is stored in a memory of the key tag. The door controller includes a reading module and a control module electrically connected to the reading module. The door controller further includes an authorization button and an authorization cancellation button. The control module includes a memory for storing at least one authorized management identification number. The control module is configured to drive the reading module to read the key tag and the near field communication device to obtain the first management identification number of the key tag and the access identification number of the near field communication device. The door controller is configured to grant door lock management authority to the key tag by storing the first management identification number into the memory of the control module. The door controller is adapted to be electrically connected to a door lock mounted on a door and is adapted to be operated to unlock the door lock.

When the near field communication device executes the door access APP, the control module is permitted to obtain the access identification number of the near field communication device through the reading module when the near field communication device is within a communication range of the reading module.

When the near field communication device does not execute the door access APP, the control module is not permitted to obtain the access identification number through the reading module even if the near field communication device is within the communication range of the reading module.

Operation of the authorization button and the authorization cancellation button is permitted when the control module identifies that the first management identification number in the key tag is identical to one of the at least one authorized management identification number in the control module.

Operation of the authorization button and the authorization cancellation button is not permitted when the control module identifies that the first management identification number in the key tag is not identical to any one of the at least one authorized management identification number in the control module.

If the authorization button is operated, the control module obtains the access identification number of the near field communication device through the reading module and stores the access identification number of the near field communication device in the memory of the control module when the near field communication device is within the communication range of the reading module, and the control module adds the access identification number into an access list in the control module and sets the access identification number as an authorized access identification number in the access list to grant door access authority to the near field communication device.

If the cancellation button is operated, the access identification number of the near field communication device is obtained by the control module when the near field communication device is within the communication range of the reading module, the control module compares the access identification number of the near field communication device with the access list, and the control module deletes the access identification number of the near field communication device from the access list or cancelling the door access authority of the access identification number of the near field communication device, such that unlocking of the door lock by the near field communication device is not permitted.

When neither the authorization button nor the authorization cancellation button is operated and when the near field communication device is within the communication range of the reading module, the control module compares the access identification number of the near field communication device with the access list, and the door lock is unlocked if the access identification number of the near field communication device is identified to be identical to one of at least one authorized access identification number in the access list. On the other hand, the door lock is not unlocked if the access identification number of the near field communication device is identified to be not identical to any one of the at least one authorized access identification number in the access list.

The door lock management control system can further include a near field communication controllable device. A door access control APP is installed in the near field communication controllable device and includes a user adding function, a user cancelling function, and a synchronization function. The door access control APP obtains a second management identification number, and the second management identification number is stored in a memory of the near field communication controllable device. The control module is configured to drive the reading module to read the near field communication controllable device and to obtain the second management identification number of near field communication controllable device. The door controller is configured to grant the door lock management authority to the near field communication controllable device by storing the second management identification number into the memory of the control module.

When the near field communication controllable device executes the door access control APP, the control module is permitted to obtain the second management identification number of the near field communication controllable device through the reading module when the near field communication controllable device is within the communication range of the reading module.

When the near field communication controllable device does not execute the door access control APP, the control module is not permitted to obtain the second management identification number of the near field communication controllable device through the reading module even if the near field communication controllable device is within the communication range of the reading module.

When the near field communication controllable device executes the user adding function, the near field communication controllable device obtains the access identification number of the near field communication device if the near field communication device is within a communication range of the near field communication controllable device, and the near field communication controllable device adds the access identification number into an access list in the near field communication controllable device and sets the access identification number as an authorized access identification number to grant door access authority to the near field communication device.

When the near field communication controllable device executes the user cancelling function, the near field communication controllable device is capable of selecting an authorized access identification number from the access list in the near field communication controllable device and is capable of deleting the selected authorized access identification number from the access list in the near field communication controllable device or cancelling the door access authority of the selected authorized access identification number.

When the near field communication controllable device executes the synchronization function, the control module is permitted to obtain the second management identification number of the near field communication controllable device through the reading module when the near field communication controllable device is within the communication range of the reading module.

If the control module identifies that the second management identification number in the near field communication controllable device is identical to one of the at least one authorized management identification number in the control module, the control module accepts synchronization to change the access list in the control module to be identical to the access list in the near field communication controllable device.

On the other hand, if the control module identifies that the second management identification number in the near field communication controllable device is not identical to any one of the at least one authorized management identification number in the control module, synchronization of the access list of the control module is not carried out.

The near field communication controllable device can be a mobile device.

The near field communication device can be a mobile device.

The door access APP installed in the near field communication device and the door access control APP installed in the near field communication controllable device can be the same APP.

The door lock management control system can further include an inductive card having a pre-set access identification number. The inductive card is configured to be granted door access authority by the key tag or the near field communication controllable device if the authorization button is pressed and if the inductive card is within the communication range of the reading module.

The control module can be configured to store door access record of the near field communication device, and the near field communication controllable device is configured to receive the door access record from the control module by point-to-point transmission.

The reading module can use a radio frequency of one of near field communication, high frequency, and ultrahigh frequency to transmit.

In a second aspect, a door lock management control system includes a door access unit, a near field communication controllable device, and a door controller. An access identification number is stored in a memory of the door access unit. A door access control APP is installed in the near field communication controllable device and includes a user adding function, a user cancelling function, and a synchronization function. The door access control APP obtains a management identification number, and the management identification number stored in a memory of the near field communication controllable device. The door controller includes a reading module and a control module electrically connected to the reading module. The control module includes a memory for storing at least one authorized management identification number. The control module is configured to drive the reading module to read the door access unit and the near field communication controllable device and to obtain the access identification number of the door access unit and the management identification number of near field communication controllable device. The door controller is configured to grant door lock management authority to the near field communication controllable device by storing the management identification number into the memory of the control module. The door controller is adapted to be electrically connected to a door lock mounted on a door and is adapted to be operated to unlock the door lock.

When the near field communication controllable device executes the door access control APP, the control module is permitted to obtain the management identification number of the near field communication controllable device through the reading module when the near field communication controllable device is within a communication range of the reading module.

When the near field communication controllable device does not execute the door access control APP, the control module is not permitted to obtain the management identification number through the reading module even if the near field communication controllable device is within the communication range of the reading module.

When the near field communication controllable device executes the user adding function, the near field communication controllable device obtains the access identification number of the door access unit if the door access unit is within a communication range of the near field communication controllable device, and the near field communication controllable device adds the access identification number into an access list in the near field communication controllable device and sets the access identification number as an authorized access identification number to grant door access authority to the door access unit.

When the near field communication controllable device executes the user cancelling function, the near field communication controllable device is capable of selecting an authorized access identification number from the access list and is capable of deleting the selected authorized access identification number from the access list in the near field communication controllable device or cancelling door access authority of the selected authorized access identification number.

When the near field communication controllable device executes the synchronization function, the control module is permitted to obtain the management identification number of the near field communication controllable device through the reading module when the near field communication controllable device is within communication range of the reading module.

If the control module identifies that the management identification number in the near field communication controllable device is identical to one of the at least one authorized management identification number in the control module, the control module accepts synchronization to create an access list in the control module identical to the access list in the near field communication controllable device.

On the other hand, if the control module identifies that the management identification number in the near field communication controllable device is not identical to any of the at least one authorized management identification number in the control module, synchronization of the access list of the control module is not carried out.

When the door access unit is within a communication range of the reading module, the control module compares the access identification number of the door access unit with the access list in the control number, and the door lock is unlocked if the access identification number of the door access unit is identified to be identical to one of the at least one authorized access identification number in the access list. On the other hand, the door lock is not unlocked if the access identification number of the door access unit is identified to be not identical to any one of the at least one authorized access identification number in the access list.

The door access unit can include a near field communication device, and the memory of the door access unit is mounted in the near field communication device. A door access APP is installed in the near field communication device and has an authority requesting function. The door access APP obtains the access identification number and stores the access identification number in the memory in the near field communication device.

When the near field communication controllable device executes the adding user function and when the near field communication device executes the authority requesting function, the near field communication controllable device is permitted to read the access identification number of the near field communication device if the near field communication device is within the communication range of the near field communication controllable device, the near field communication controllable device adds the access identification number into the access list in the near field communication controllable device and sets the access identification number as the authorized access identification number to grant door access authority to the near field communication device.

When the near field communication device executes the door access APP, the control module is permitted to obtain the access identification number of the near field communication device through the reading module when the near field communication device is within the communication range of the reading module, wherein the control module compares the access identification number of the near field communication device with in the access list in the control module, the door lock is unlocked if the access identification number of the near field communication device is identified to be identical to one of the at least one authorized access identification number in the access list in the control module, and the door lock is not unlocked if the access identification number of the near field communication device is identified to be not identical to any one of the at least one authorized access identification number in the access list in the control module.

The near field communication controllable device can be a mobile device.

The near field communication device can be a mobile device.

The door access APP installed in the near field communication device and the door access control APP installed in the near field communication controllable device can be the same APP.

The near field communication controllable device can include a screen. The door access control APP generates a synchronization icon on the screen of the near field communication controllable device for performing the synchronization function. The synchronization function starts after the synchronization icon is pressed and after the near field communication controllable device is placed within the communication range of the reading module. On the other hand, the synchronization function is not carried out if the near field communication controllable device is not placed within the communication range of the reading module within a period of time counting from pressing of the synchronization icon.

The door lock management control system can further include an inductive card having a pre-set access identification number. Door access authority of the inductive card is granted or cancelled by the near field communication controllable device when the near field communication controllable device executes the user adding function or the user cancelling function.

In another example, the door access unit is an inductive card, and the access identification number is pre-set in the inductive card. Door access authority of the inductive card is granted or cancelled by the near field communication controllable device when the near field communication controllable device executes the user adding function or the user cancelling function and when the inductive card is within the communication range of the near field communication controllable device.

The control module can be configured to store door access record of the door access unit, and wherein the near field communication controllable device is configured to receive the door access record from the control module by point-to-point transmission.

The reading module can use a radio frequency of one of near field communication, high frequency, and ultrahigh frequency to transmit.

The present invention will become clearer in light of the following detailed description of illustrative embodiments of this invention described in connection with the drawings.

DESCRIPTION OF THE DRAWINGS

FIG. 7 is a perspective view illustrating placing a near field communication device within a communication range of the door lock controller of the door lock management control system according to the present invention.

DETAILED DESCRIPTION OF THE INVENTION

Figure 1:
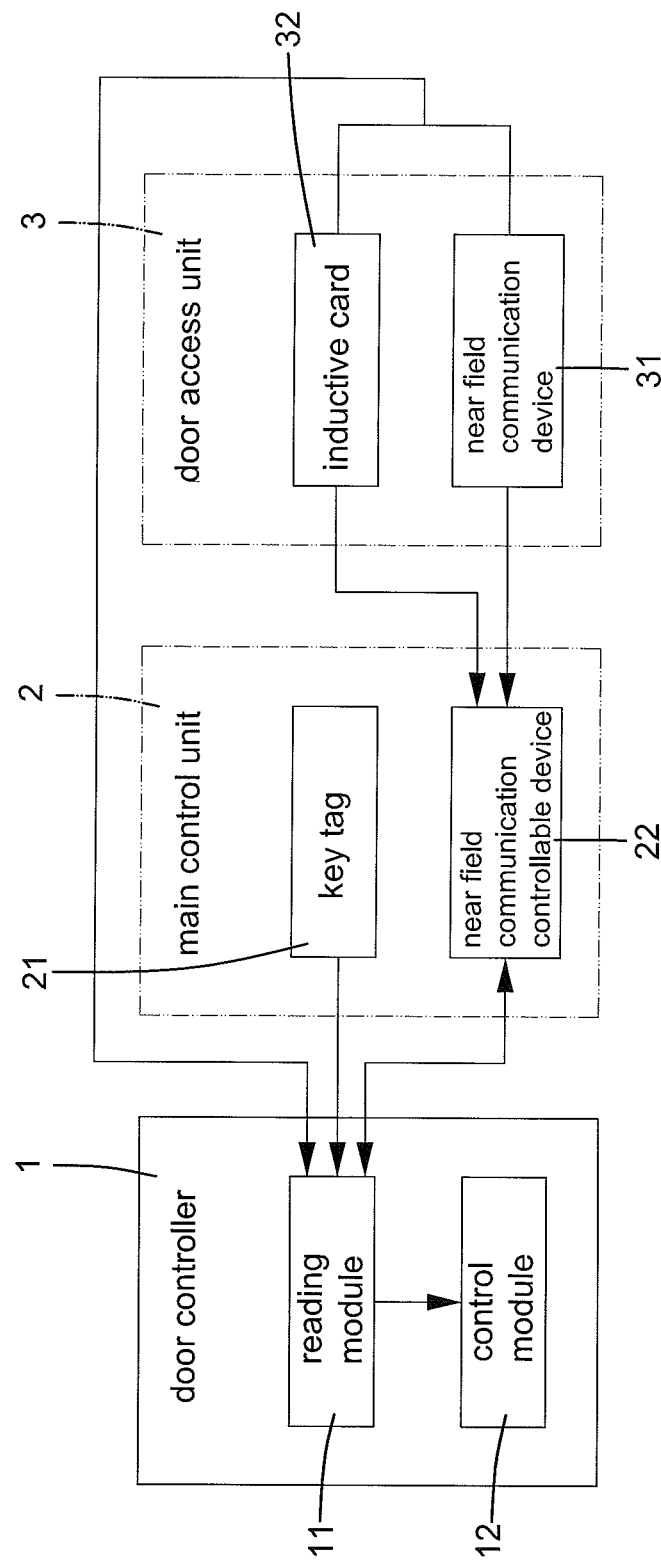
FIG. 1 is a block diagram of a door lock management control system of an example according to the present invention.
Figure 2:
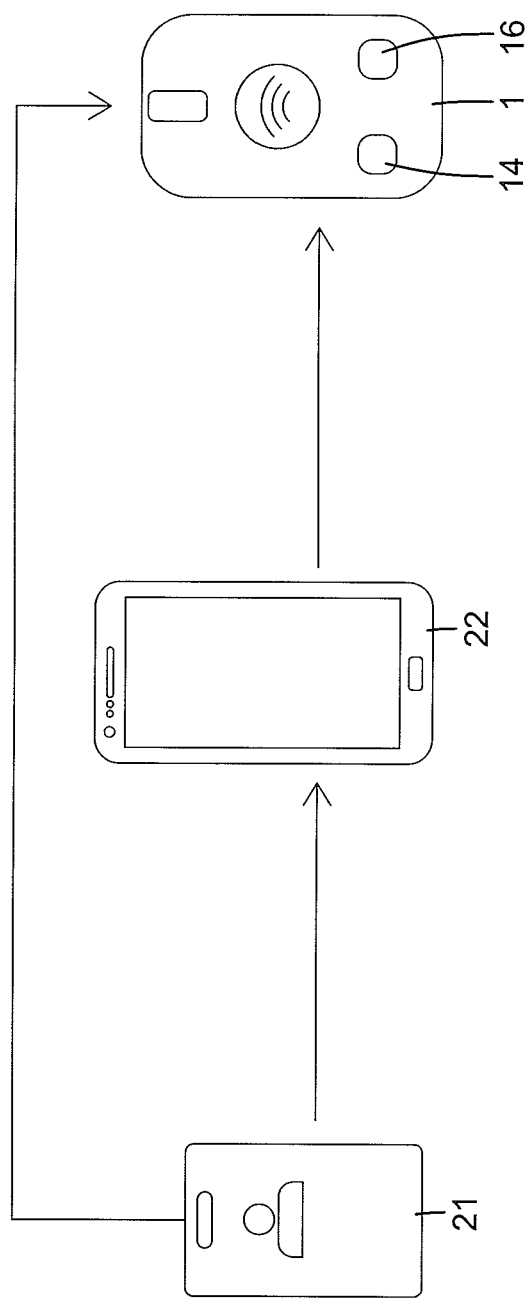
FIG. 2 is a diagrammatic view of a main control unit and a door controller of the door lock management control system according to the present invention.

With reference to FIGS. 1 and 2, a door lock management control system of an example according to the present invention includes a door controller 1, a main control unit 2, and a door access unit 3.

The door controller 1 includes a reading module 11 and a control module 12 electrically connected to the reading module 11. The door controller 1 further includes an authorization button 14 and an authorization cancellation button 16. At least one authorized management identification number can be stored in a memory of the control module 12. The control module 12 is configured to drive the reading module 11 to read the main control unit 2 and the door access unit 3. The door controller 1 is adapted to be electrically connected to a door lock mounted on a door and is adapted to be operated to unlock the door lock.

The main control unit 2 includes a key tag 21 having a memory in which a management identification number is stored. The control unit 2 further includes a near field communication controllable device 22 having a memory. A door access control APP is installed in the near field communication controllable device 22 and includes a user adding function, a user cancelling function, and a synchronization function. The door access control APP is configured to obtain a management identification number for the near field communication controllable device 22, and this management identification number is stored in the memory of the near field communication controllable device 22. The control module 12 is configured to drive the reading module 11 to read the near field communication controllable device 22 and to obtain the management identification number of near field communication controllable device 22.

The door access unit 3 includes a near field communication device 31. A door access APP is installed in the near field communication device 31 for obtaining an access identification number, and the access identification number is stored in a memory of the near field communication device 31. The door access unit 3 further includes an inductive card 32 having a pre-set access identification number.

An example of authorization of the door lock management control to the key tag 21 will now be described. Firstly, a reset button inside the door lock is pressed (note that the door lock can be detached first to permit pressing of the reset button), and the key tag 21 is placed within a communication range of the reading module 11. The reading module 11 reads the management identification number of the key tag 21 and stores the management identification number of the key tag 21 in the memory of the control module 12. Thus, the key tag 21 is granted the door lock management control authority (and the door access authority, if desired).

The door access APP installed in the near field communication device 31 and the door access control APP installed in the near field communication controllable device 22 are the same APP.

Figure 3:
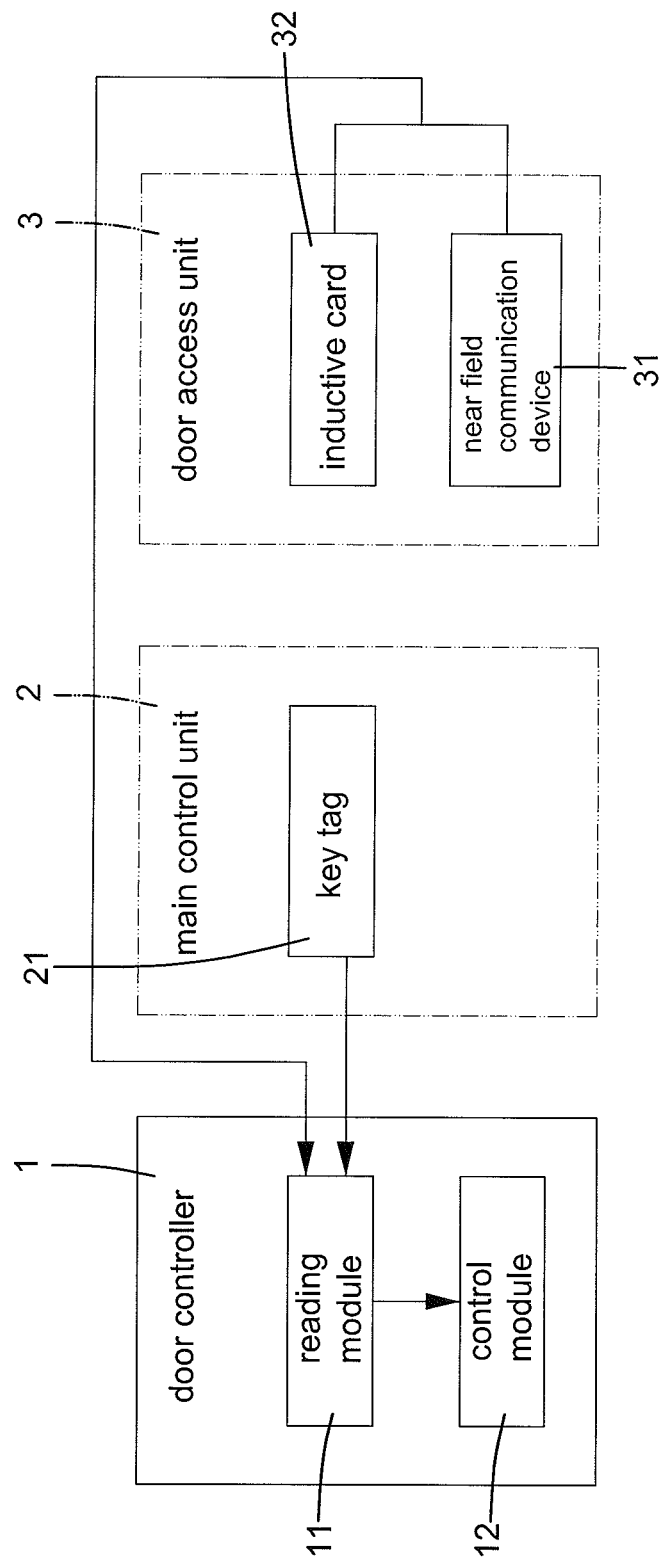
FIG. 3 is a block diagram of a door lock management control system of another example according to the present invention.

In another example shown in FIG. 3, the main control unit 2 does not include the near field communication controllable device 22. The structure and operation of the example of FIG. 3 will now be described.

Figure 5:
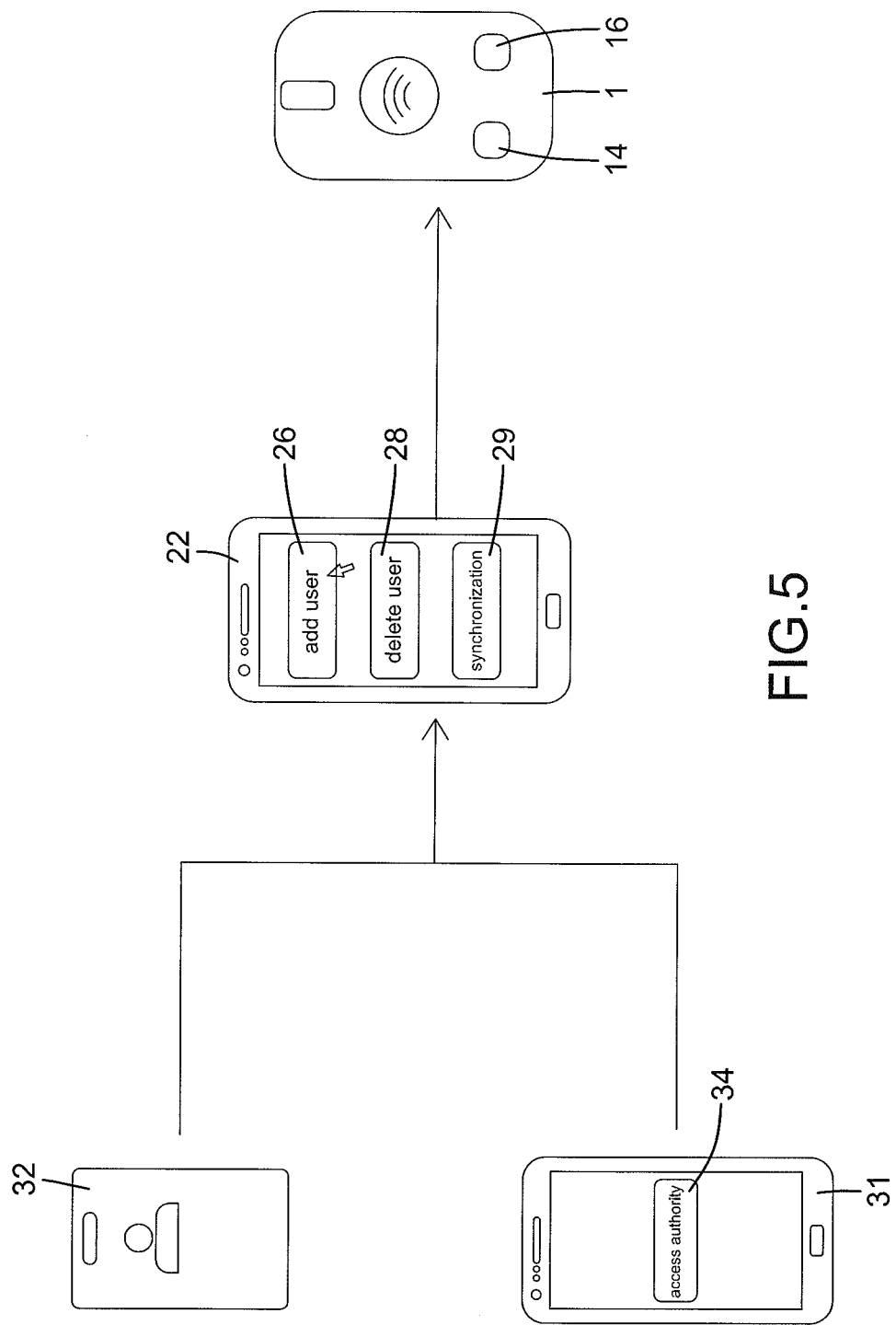
FIG. 5 is a diagrammatic view illustrating operation of adding a new user into an access list.

The near field communication device 31 can be a mobile device, such as a mobile phone, a personal digital assistant, or a tablet. The door access APP is downloaded and installed in the near field communication device 31. The near field communication device 31 executes the door access APP, wherein the door access APP obtains the access identification number, and the access identification number is stored in the memory of the near field communication device 31. In a non-restrictive example, this access identification number can be obtained from a cloud server. Furthermore, the door access APP generates an "access authority" icon 34 (c.f. FIG. 5) on a screen of the near field communication device 31 for performing an authority function (for requesting door access authority if operated together with the authorization button 14 or for requesting cancellation of door access authority if operated together with the authorization cancellation button 16).

When the key tag 21 is placed within the communication range of the reading module 11, the reading module 11 reads and obtains the management identification number of the key tag 21. The management identification number of the key tag 21 is sent to the control module 12 and is compared with at least one authorized management identification number in the control module 12. Operation of the authorization button 14 and the authorization cancellation button 16 is permitted when the control module 12 identifies that the management identification number of the key tag 21 is identical to one of the at least one authorized management identification number in the control module 12. On the other hand, operation of the authorization button 14 and the authorization cancellation button 16 is not permitted when the control module 12 identifies that the management identification number of the key tag 21 is not identical to any one of the at least one authorized management identification number in the control module 12.

In a case that the control module 12 identifies that the management identification number of the key tag 21 is identical to one of the at least one authorized management identification number in the control module 12, the authorization button 14 of the door controller 1 can be pressed for granting the door access authority to the near field communication device 31. After the "access authority" icon 34 on the near field communication device 31 executing the near field communication function and executing the door access APP is pressed, the near field communication device 31 is placed within the communication range of the reading module 11 of the door controller 1, as shown in FIG. 7. The reading module 11 reads the access identification number of the near field communication device 31, and the control module 12 adds the access identification number of the near field communication device 31 into an access list in the memory of the control module 12 and sets the access identification number of the near field communication device 31 as an authorized access identification number. The access list in the memory of the control module 12 stores at least one authorized door access number. Thus, She near field communication device 31 is granted the door access authority.

Note that when the near field communication device 31 does not execute the door access APP, the control module 12 is not permitted to obtain the access identification number through the reading module 11 even if the near field communication device 31 is within the communication range of the reading module 11.

As for granting the door access authority to the inductive card 32, the key tag 21 is placed within the communication range of the reading module 11, and the reading module 11 reads and obtains the management identification number of the key tag 21. The management identification number of the key tag 21 is sent to the control module 12 and is compared with at least one authorized management identification number in the control module 12. In a case that the control module 12 identifies that the management identification number of the key tag 21 is identical to one of the at least one authorized management identification number in the control module 12, the authorization button 14 is pressed, and the inductive card 32 is placed within the communication range of the reading module 11. The reading module 11 reads the pre-set access identification number of the inductive card 32, and the control module 12 adds the pre-set access identification number of the inductive card 32 into the access list in the memory of the control module 12 and sets the pre-set access identification number of the inductive card 32 as an authorized access identification number. Thus, the inductive card 32 is granted the door access authority.

When it is desired to cancel the door access authority of the near field communication device 31, the key tag 21 is placed within the communication range of the reading module 11, and reading module 11 reads and obtains the management identification number of the key tag 21. The management identification number of the key tag 21 is sent to the control module 12 and is compared with at least one authorized management identification number in the control module 12. In a case that the control module 12 identifies that the management identification number of the key tag 21 is identical to one of the at least one authorized management identification number in the control module 12, the authorization cancellation button 16 of the door controller 1 is pressed. After the "access authority" icon 34 on the near field communication device 31 executing the near field communication function and executing the door access APP is pressed, the near field communication device 31 is placed within the communication range of the reading module 11. The reading module 11 reads the access identification number of the near field communication device 31, and the control module 12 delete the access identification number of the near field communication device 31 from the access list in the memory of the control module 12 or simply cancels the door access authority of the near field communication device 31. Thus, the door access authority of the near field communication device 31 is cancelled.

When it is desired to cancel the door access authority of the conductive card 32, the key tag 21 is placed within the communication range of the reading module 11, and reading module 11 reads and obtains the management identification number of the key tag 21. The management identification number of the key tag 21 is sent to the control module 12 and is compared with at least one authorized management identification number in the control module 12. In a case that the control module 12 identifies that the management identification number in the key tag 21 is identical to one of the at least one authorized management identification number in the control module 12, the authorization cancellation button 16 of the door controller 1 is pressed. The conductive card 32 is placed within the communication range of the reading module 11. The reading module 11 reads the pre-set access identification number of the conductive card 32, and the control module 12 delete the pre-set access identification number of the conductive card 32 from the access list in the memory of the control module 12 or simply cancels the door access authority of the conductive card 32. Thus, the door access authority of the conductive card 32 is cancelled.

When using the near field communication device 31 to access the door, neither the authorization button 14 nor the authorization button 16 is pressed. The door access APP and the near field communication function of the near field communication device 31 are executed, and the near field communication device 31 is placed within the communication range of the reading module 11. The reading module 11 reads the access identification number of the near field communication device 31. The control module 12 compares the access identification number of the near field communication device 31 with the access list of the control module 12. The door is unlocked if the access identification number of the near field communication device 31 is identified to be identical to one of at least one authorized access identification number in the access list. On the other hand, the door lock is not unlocked if the access identification number of the near field communication device 31 is identified to be not identical to any one of the at least one authorized access identification number in the access list.

Accessing the door by using the inductive card 32 is substantially the same as the procedures using the near field communication device 31 except for execution of the door access APP.

Figure 4:
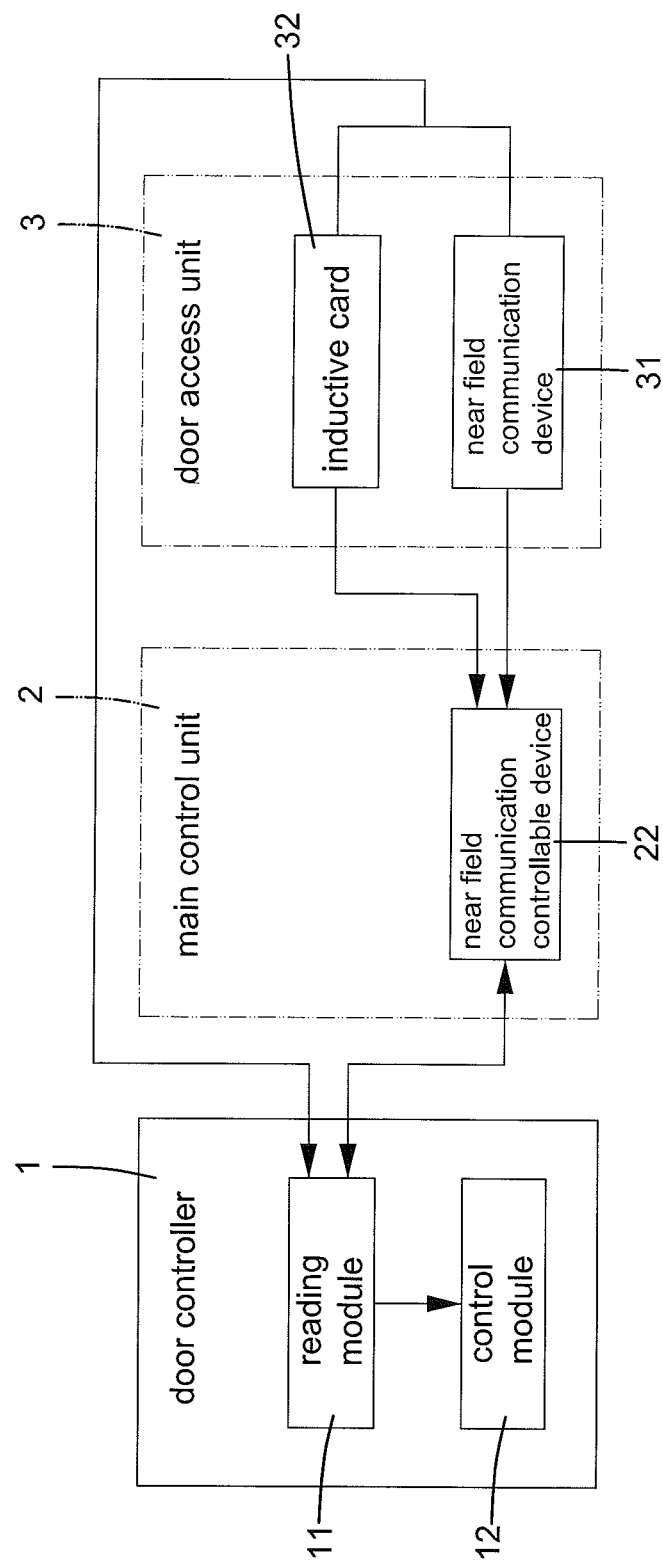
FIG. 4 is a bock diagram of a door lock management control system of a further example according to the present invention.

In a further example shown in FIG. 4, the main control unit 2 does not include the key tag 21. The structure and operation of the example of FIG. 4 will now be described.

The near field communication device 31 can be a mobile device, such as a mobile phone, a personal digital assistant, or a tablet. The door access APP is downloaded and installed in the near field communication device 31. The near field communication device 31 executes the door access APP, wherein the door access APP obtains the access identification number, and the access identification number is stored in the memory of the near field communication device 31. In a non-restrictive example, this access identification number can be obtained from a cloud server. Furthermore, the door access APP generates an "access authority" icon 34 on a screen of the near field communication device 31 for performing an authority function (for requesting door access authority if operated together with the authorization button 14 or for requesting cancellation of door access authority if operated together with the authorization cancellation button 16).

The near field communication controllable device 22 can be a mobile device, such as a mobile phone, a personal digital assistant, or a tablet. The door access control APP is downloaded and installed in the near field communication controllable device 22. The door access control APP includes a user adding function, a user cancelling function, and a synchronization function. The door access control APP obtains a management identification number, and the management identification number is stored in the memory of the near field communication controllable device 22. In a non-restrictive example, this management identification number can be obtained from a cloud server. Furthermore, the door access control APP can generate a "requesting authority" icon on a screen of the near field communication controllable device 22 for performing an authority requesting function. The door access control APP also generates an "add user" icon 26 (FIG. 5) on the screen of the near field communication controllable device 22 to perform the user adding function. The door access control APP also generates a "delete user" icon 28 (FIG. 5) on the screen of the near field communication controllable device 22 to perform the "user cancelling function". Furthermore, the door access control APP can generate a "synchronization" icon 29 (FIG. 5) on the screen of the near field communication controllable device 22 to perform the synchronization function.

An example of authorization of the door lock management control to the near field communication controllable device 22 will now be described. Firstly, the "authority requesting" icon of the near field communication controllable device 22 is pressed, and the reset button inside the door lock is pressed (note that the door lock can be detached first to permit pressing of the reset button). The near field communication controllable device 22 is then placed within the communication range of the reading module 11. The reading module 11 reads the management identification number stored in the near field communication controllable device 22 and stores the management identification number of the near field communication controllable device 22 in the memory of the control module 12. Thus, the near field communication controllable device 22 is granted the door lock management control authority (and the door access authority, if desired).

When it is desired to grant the door access authority to the near field communication device 31, the near field communication controllable device 22 executes the door access control APP and executes the near field communication function, and the "adding user" icon 26 on the screen of the near field communication controllable device 22 is pressed (FIG. 5). The near field communication device 31 executes the near field communication function and executes the door access APP, and the "access authority" icon 34 on the screen of the near field communication device 31 is pressed to perform the user adding function (FIG. 5). Then, the near field communication device 31 is placed within the communication range of the near field communication controllable device 22. The near field communication controllable device 22 obtains and adds the access identification number of the near field communication device 31 into the access list in the memory of the near field communication controllable device 22, and sets the access identification number of the near field communication device 31 as an authorized access identification number. Then, the "synchronization" icon 29 of the near field communication controllable device 22 is pressed, and the door access control APP executes a countdown program. The near field communication controllable device 22 is placed within the communication range of the reading module 11 within a period of time 25, counting from pressing of the "synchronization" icon 29. The authorized access identification numbers in the access list of the near field communication controllable device 22 (including the access identification number of the near field communication device 31) are sent by the near field communication controllable device 22 to the control module 12 and are stored in the access list in the memory of the control module 12 to grant the door access authority to the near field communication device 31 as well as other authorized access identification numbers in the access list of the near field communication controllable device 22. Note that the synchronization function starts after the "synchronization" icon 29 is pressed and after the near field communication controllable device 22 is placed within the communication range of the reading module 11. On the other hand, the synchronization function is not carried out if the near field communication controllable device 22 is not placed within the communication range of the reading module 11 within a period of time counting from pressing of the "synchronization" icon 29.

It can be appreciated that if the control module 12 identifies that the management identification number in the near field communication controllable device 22 is identical to the authorized management identification number in the control module 12, the control module 12 accepts synchronization to create an access list in the control module 12 identical to the access list in the near field communication controllable device 22. On the other hand, if the control module 12 identifies that the management identification number in the near field communication controllable device 22 is not identical to the authorized management identification number in the control module 12, synchronization of the access list of the control module 12 is not carried out.

Note that when the near field communication device 31 does not execute the door access APP, the control module 12 is not permitted to obtain the access identification number through the reading module 11 even if the near field communication device 31 is within the communication range of the reading module 11.

As for granting the door access authority to the inductive card 32, the near field communication controllable device 22 executes the door access control APP and executes the near field communication function, and the "adding user" icon 26 on the screen of the near field communication controllable device 22 is pressed. The inductive card 32 is placed within the communication range of the near field communication controllable device 22. The near field communication controllable device 22 obtains and adds the pre-set access identification number of the conductive card 32 into the access list in the memory of the near field communication controllable device 22, and sets pre-set access identification number of the conductive card 32 as an authorized access identification number. Then, the "synchronization" icon 29 of the near field communication controllable device 22 is pressed, and the door access control APP executes a countdown program. The near field communication controllable device 22 is placed within the communication range of the reading module 11 within a period of time counting from pressing of the "synchronization" icon 29. The authorized access identification numbers in the access list of the near field communication controllable device 22 (including the pre-set access identification number of the conductive card 32) are sent to the control module 12 and are stored in the access list in the memory of the control module 12 to grant the door access authority to the conductive card 32 as well as other authorized access identification numbers in the access list of the near field communication controllable device 22.

Note that when the near field communication controllable device 22 does not execute the door access control APP, the control module 12 is not permitted to obtain the management identification number through the reading module 11 even if the near field communication controllable device 22 is within the communication range of the reading module 11.

Figure 6:
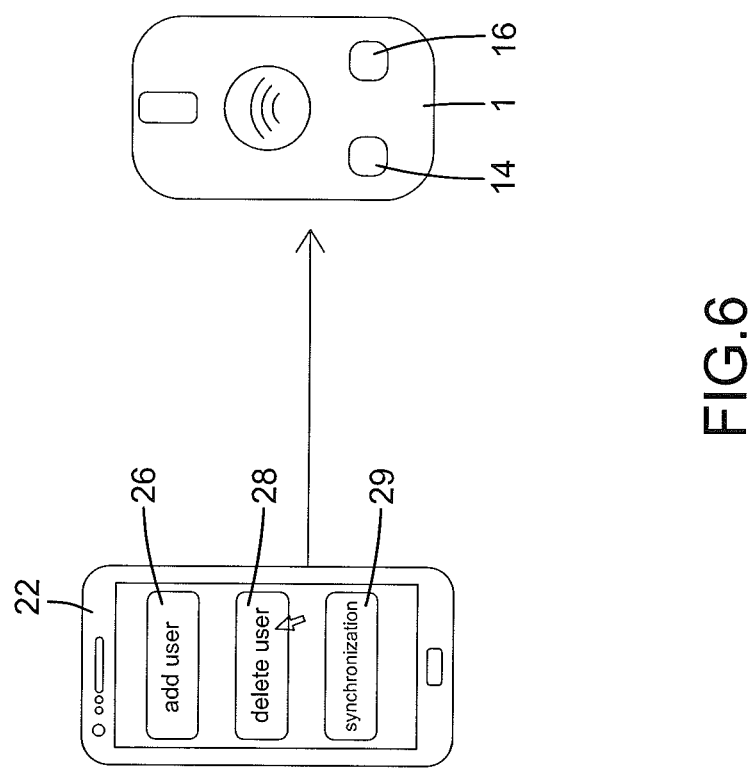
FIG. 6 is a diagrammatic view illustrating operation of deleting a user from the access list.

When it is desired to cancel the door access authority of the near field communication device 31 or the inductive card 32, the near field communication controllable device 22 executes the door access control APP to retrieve the access list. The access list is displayed on the screen of the near field communication controllable device 22. The user of the near field communication controllable device 22 can select an authorized access identification number (which is the same as the access identification number of the near field communication device 31 executing the near field communication function and executing the door access APP or the pre-set access identification number of the inductive card 32) from the access list on the screen and presses the "delete user" icon 28 on the screen of the near field communication controllable device 22 (FIG. 6). Then, the "synchronization" icon 29 of the near field communication controllable device 22 is pressed, and the door access control APP executes the countdown program. The near field communication controllable device 22 is placed within the communication range of the reading module 11 within a period of time counting from pressing of the "synchronization" icon 29. The authorized access identification numbers in the access list of the near field communication controllable device 22 (excluding the access identification number of the near field communication device 31 or the inductive card 32) are sent to the control module 12 and stored in the access list in the memory of the control module 12. Thus, the door access authority of the near field communication device 31 or the inductive card 32 is cancelled.

When using the near field communication device 31 to access the door, neither the authorization button 14 nor the authorization cancellation button 16 is pressed. The door access APP and the near field communication function of the near field communication device 31 are executed, and the near field communication device 31 is placed within the communication range of the reading module 11. The reading module 11 reads the access identification number of the near field communication device 31. The control module 12 compares the access identification number of the near field communication device 31 with the access list of the control module 12. The door is unlocked if the access identification number of the near field communication device 31 is identified to be identical to one of at least one authorized access identification number in the access list of the control module 12. On the other hand, the door lock is not unlocked if the access identification number of the near field communication device 31 is identified to be not identical to any one of the at least one authorized access identification number in the access list of the control module 12.

Accessing the door by using the inductive card 32 is substantially the same as the procedures using the near field communication device 31 except for execution of the door access APP.

The control module 12 can store door access record of the near field communication device 31 and the conductive card 32. The near field communication controllable device 22 can receive the door access record from the control module 12 by point-to-point transmission. The reading module 11 can use a radio frequency of one of near field communication, high frequency, and ultrahigh frequency to transmit.

The structure and operation of the door lock management control system shown in FIG. 1 are substantially the same as those of the door lock management control systems shown in FIGS. 3 and 4, which can be appreciated by one having ordinary skill in the art.

In view of the foregoing, the door lock management control systems are suitable for mobile devices with a near field communication function, providing convenient access. Furthermore, combination of the door lock management control systems with the communication technique permits more efficient management. Furthermore, production of inductive cards 32 and dispatching the inductive cards 32 to the users are not always necessary to the door lock management control systems using the near field communication technique.

Although specific embodiments have been illustrated and described, numerous modifications and variations are still possible without departing from the scope of the invention. The scope of the invention is limited by the accompanying claims.

The invention claimed is:
1. A door lock management control system comprising:
a near field communication device including a memory, with a door access APP installed in the near field communication device, with the door access APP obtaining an access identification number, and with the access identification number stored in the memory of the near field communication device;
a key tag including a memory, with a first management identification number stored in the memory of the key tag; and
a door controller including a reading module and a control module electrically connected to the reading module, with the door controller further including an authorization button and an authorization cancellation button, with the control module including a memory for storing at least one authorized management identification number, with the control module configured to drive the reading module to read the key tag and the near field communication device to obtain the first management identification number of the key tag and the access identification number of the near field communication device, with the door controller configured to grant door lock management authority to the key tag by storing the first management identification number into the memory of the control module, and with the door controller adapted to be electrically connected to a door lock mounted on a door and adapted to be operated to unlock the door lock;
wherein when the near field communication device executes the door access APP, the control module is permitted to obtain the access identification number of the near field communication device through the reading module when the near field communication device is within a communication range of the reading module,
wherein when the near field communication device does not execute the door access APP, the control module is not permitted to obtain the access identification number through the reading module even if the near field communication device is within the communication range of the reading module,
wherein operation of the authorization button and the authorization cancellation button is permitted when the control module identifies that the first management identification number in the key tag is identical to one of the at least one authorized management identification number in the control module,
wherein operation of the authorization button and the authorization cancellation button is not permitted when the control module identifies that the first management identification number in the key tag is not identical to any one of the at least one authorized management identification number in the control module,
wherein if the authorization button is operated, the control module obtains the access identification number of the near field communication device through the reading module and stores the access identification number of the near field communication device in the memory of the control module when the near field communication device is within the communication range of the reading module, and the control module adds the access identification number into an access list in the control module and sets the access identification number as an autho- rized access identification number in the access list to grant door access authority to the near field communication device, wherein if the cancellation button is operated, the access identification number of the near field communication device is obtained by the control module when the near field communication device is within the communication range of the reading module, the control module compares the access identification number of the near field communication device with the access list, the control module deletes the access identification number of the near field communication device from the access list or cancelling the door access authority of the access identification number of the near field communication device, such that unlocking of the door lock by the near field communication device is not permitted, and wherein when neither the authorization button nor the authorization cancellation button is operated and when the near field communication device is within the communication range of the reading module, the control module compares the access identification number of the near field communication device with the access list, and the door lock is unlocked if the access identification number of the near field communication device is identified to be identical to one of at least one authorized access identification number in the access list, and the door lock is not unlocked if the access identification number of the near field communication device is identified to be not identical to any one of the at least one authorized access identification number in the access list.

2. The door lock management control system as claimed in claim 1, further comprising a near field communication controllable device including a memory, with a door access control APP installed in the near field communication controllable device and including a user adding function, a user cancelling function, and a synchronization function, with the door access control APP obtaining a second management identification number, with the second management identification number stored in the memory of the near field communication controllable device, with the control module configured to drive the reading module to read the near field communication controllable device and to obtain the second management identification number of near field communication controllable device, and with the door controller configured to grant the door lock management authority to the near field communication controllable device by storing the second management identification number into the memory of the control module, wherein when the near field communication controllable device executes the door access control APP, the control module is permitted to obtain the second management identification number of the near field communication controllable device through the reading module when the near field communication controllable device is within the communication range of the reading module, wherein when the near field communication controllable device does not execute the door access control APP, the control module is not permitted to obtain the second management identification number of the near field communication controllable device through the reading module even if the near field communication controllable device is within the communication range of the reading module, wherein when the near field communication controllable device executes the user adding function, the near field communication controllable device obtains the access identification number of the near field communication device if the near field communication device is within a communication range of the near field communication controllable device, and the near field communication controllable device adds the access identification number into an access list in the near field communication controllable device and sets the access identification number as an authorized access identification number to grant door access authority to the near field communication device, wherein when the near field communication controllable device executes the user cancelling function, the near field communication controllable device is capable of selecting an authorized access identification number from the access list in the near field communication controllable device and is capable of deleting the selected authorized access identification number from the access list in the near field communication controllable device or cancelling the door access authority of the selected authorized access identification number, wherein when the near field communication controllable device executes the synchronization function, the control module is permitted to obtain the second management identification number of the near field communication controllable device through the reading module when the near field communication controllable device is within the communication range of the reading module, wherein if the control module identifies that the second management identification number in the near field communication controllable device is identical to one of the at least one authorized management identification number in the control module, the control module accepts synchronization to change the access list in the control module to be identical to the access list in the near field communication controllable device, and wherein if the control module identifies that the second management identification number in the near field communication controllable device is not identical to any one of the at least one authorized management identification number in the control module, synchronization of the access list of the control module is not carried out.

3. The door lock management control system as claimed in claim 2, wherein the near field communication controllable device is a mobile device.

4. The door lock management control system as claimed in claim 3, wherein the near field communication device is a mobile device.

5. The door lock management control system as claimed in claim 4, wherein the door access APP installed in the near field communication device and the door access control APP installed in the near field communication controllable device are a same APP.

6. The door lock management control system as claimed in claim 5, further comprising an inductive card having a pre-set access identification number, with the inductive card configured to be granted door access authority by the key tag or the near field communication controllable device if the authorization button is pressed and if the inductive card is within the communication range of the reading module.

7. The door lock management control system as claimed in claim 2, wherein the control module is configured to store door access record of the near field communication device, and wherein the near field communication controllable device is configured to receive the door access record from the control module by point-to-point transmission.

8. The door lock management control system as claimed in claim 7, wherein the reading module uses a radio frequency of one of near field communication, high frequency, and ultra-high frequency to transmit.

9. The door lock management control system as claimed in claim 1, wherein the reading module uses a radio frequency of one of near field communication, high frequency, and ultra-high frequency to transmit.

10. A door lock management control system comprising:
a door access unit including a memory, with an access identification number stored in the memory of the door access unit;
a near field communication controllable device including a memory, with a door access control APP installed in the near field communication controllable device and including a user adding function, a user cancelling function, and a synchronization function, with the door access control APP obtaining a management identification number, and with the management identification number stored in the memory of the near field communication controllable device; and
a door controller including a reading module and a control module electrically connected to the reading module, with the control module including a memory for storing at least one authorized management identification number, with the control module configured to drive the reading module to read the door access unit and the near field communication controllable device and to obtain the access identification number of the door access unit and the management identification number of near field communication controllable device, with the door controller configured to grant door lock management authority to the near field communication controllable device by storing the management identification number into the memory of the control module, and with the door controller adapted to be electrically connected to a door lock mounted on a door and adapted to be operated to unlock the door lock;
wherein when the near field communication controllable device executes the door access control APP, the control module is permitted to obtain the management identification number of the near field communication controllable device through the reading module when the near field communication controllable device is within a communication range of the reading module,
wherein when the near field communication controllable device does not execute the door access control APP, the control module is not permitted to obtain the management identification number through the reading module even if the near field communication controllable device is within the communication range of the reading module,
wherein when the near field communication controllable device executes the user adding function, the near field communication controllable device obtains the access identification number of the door access unit if the door access unit is within a communication range of the near field communication controllable device, and the near field communication controllable device adds the access identification number into an access list in the near field communication controllable device and sets the access identification number as an authorized access identification number to grant door access authority to the door access unit,
wherein when the near field communication controllable device executes the user cancelling function, the near field communication controllable device is capable of selecting an authorized access identification number from the access list and is capable of deleting the selected authorized access identification number from the access list in the near field communication controllable device or cancelling door access authority of the selected authorized access identification number,
wherein when the near field communication controllable device executes the synchronization function, the control module is permitted to obtain the management identification number of the near field communication controllable device through the reading module when the near field communication controllable device is within communication range of the reading module,
wherein if the control module identifies that the management identification number in the near field communication controllable device is identical to one of the at least one authorized management identification number in the control module, the control module accepts synchronization to create an access list in the control module identical to the access list in the near field communication controllable device,
wherein if the control module identifies that the management identification number in the near field communication controllable device is not identical to any of the at least one authorized management identification number in the control module, synchronization of the access list of the control module is not carried out, and
wherein when the door access unit is within a communication range of the reading module, the control module compares the access identification number of the door access unit with the access list in the control number, and the door lock is unlocked if the access identification number of the door access unit is identified to be identical to one of at least one authorized access identification number in the access list, and the door lock is not unlocked if the access identification number of the door access unit is identified to be not identical to any one of the at least one authorized access identification number in the access list.

11. The door lock management control system as claimed in claim 10, with the door access unit including a near field communication device, with the memory of the door access unit mounted in the near field communication device, with a door access APP installed in the near field communication device and having an authority requesting function, with the door access APP obtaining the access identification number and storing the access identification number in the memory in the near field communication device,
wherein when the near field communication controllable device executes the adding user function and when the near field communication device executes the authority requesting function, the near field communication controllable device is permitted to read the access identification number of the near field communication device if the near field communication device is within the communication range of the near field communication controllable device, the near field communication controllable device adds the access identification number into the access list in the near field communication controllable device and sets the access identification number as the authorized access identification number to grant door access authority to the near field communication device,
wherein when the near field communication device executes the door access APP, the control module is permitted to obtain the access identification number of the near field communication device through the reading module when the near field communication device is within the communication range of the reading module, wherein the control module compares the access identification number of the near field communication device with in the access list in the control module, the door lock is unlocked if the access identification number of the near field communication device is identified to be identical to one of the at least one authorized access identification number in the access list in the control module, and the door lock is not unlocked if the access identification number of the near field communication device is identified to be not identical to any one of the at least one authorized access identification number in the access list in the control module.

12. The door lock management control system as claimed in claim 11, wherein the near field communication controllable device is a mobile device.

13. The door lock management control system as claimed in claim 12, wherein the near field communication device is a mobile device.

14. The door lock management control system as claimed in claim 13, wherein the door access APP installed in the near field communication device and the door access control APP installed in the near field communication controllable device are a same APP.

15. The door lock management control system as claimed in claim 12, with the near field communication controllable device including a screen, with the door access control APP generating a synchronization icon on the screen of the near field communication controllable device for performing the synchronization function, wherein the synchronization function starts after the synchronization icon is pressed and after the near field communication controllable device is placed within the communication range of the reading module, and wherein the synchronization function is not carried out if the near field communication controllable device is not placed within the communication range of the reading module within a period of time counting from pressing of the synchronization icon.

16. The door lock management control system as claimed in claim 15, further comprising an inductive card having a pre-set access identification number, and wherein door access authority of the inductive card is granted or cancelled by the near field communication controllable device when the near field communication controllable device executes the user adding function or the user cancelling function and when the inductive card is within the communication range of the near field communication controllable device.

17. The door lock management control system as claimed in claim 10, wherein the door access unit is an inductive card, wherein the access identification number is pre-set in the inductive card, and wherein door access authority of the inductive card is granted or cancelled by the near field communication controllable device when the near field communication controllable device executes the user adding function or the user cancelling function and when the inductive card is within the communication range of the near field communication controllable device.

18. The door lock management control system as claimed in claim 17, with the near field communication controllable device including a screen, with the door access control APP generating a synchronization icon on the screen of the near field communication controllable device for performing the synchronization function, wherein the synchronization function starts after the synchronization icon is pressed and after the near field communication controllable device is placed within the communication range of the reading module, and wherein the synchronization function is not carried out if the near field communication controllable device is not placed within the communication range of the reading module within a period of time counting from pressing of the synchronization icon.

19. The door lock management control system as claimed in claim 10, wherein the control module is configured to store door access record of the door access unit, and wherein the near field communication controllable device is configured to receive the door access record from the control module by point-to-point transmission.

20. The door lock management control system as claimed in claim 19, wherein the reading module uses a radio frequency of one of near field communication, high frequency, and ultrahigh frequency to transmit.

* * * * *